(12) United States Patent
Gurevich

(10) Patent No.: US 11,108,946 B1
(45) Date of Patent: Aug. 31, 2021

(54) FOCUS STABILIZATION OF IMAGING SYSTEM WITH VARIABLE FOCUS LENS

(71) Applicant: ZEBRA TECHNOLOGIES CORPORATION, Lincolnshire, IL (US)

(72) Inventor: Vladimir Gurevich, Great Neck, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/912,420

(22) Filed: Jun. 25, 2020

(51) Int. Cl.
  *H04N 5/232* (2006.01)
  *G06K 7/14* (2006.01)

(52) U.S. Cl.
  CPC ....... *H04N 5/23212* (2013.01); *G06K 7/1465* (2013.01)

(58) Field of Classification Search
  CPC ............ G06K 7/1404; H04N 5/23212; H04N 5/232121; H04N 5/232123; H04N 5/232125; H04N 5/232127; H04N 5/232133
  See application file for complete search history.

(56) References Cited

U.S. PATENT DOCUMENTS

2018/0137318 A1* 5/2018 Canini ............... G06K 7/10811

* cited by examiner

*Primary Examiner* — Laura A Gudorf
(74) *Attorney, Agent, or Firm* — Yuri Astvatsaturov

(57) ABSTRACT

A method and apparatus for the focus stabilization of an imaging system with variable focus lenses is disclosed herein. As example imaging system includes a variable focus (VF) lens for imaging an object of interest (OOI), a controller configured to provide a voltage to the VF lens, an imaging sensor, and a processor. The processor obtains a calibration parameter, and the imaging system obtains a plurality of images of the OOI. The processor identifies a region of interest of one or more of the images, and an alignment parameter is determined from the images. The processor then determines a tuning parameter from comparing the determined alignment parameter with the obtained calibration parameter. The controller tunes the VF lens according to the determined tuning parameter.

24 Claims, 8 Drawing Sheets

FOCUS STABILIZATION OF IMAGING SYSTEM WITH VARIABLE FOCUS LENS

BACKGROUND OF THE INVENTION

Devices such as barcode scanners are used in various inventory applications. In some configurations, these barcode scanners use internal auto-focus cameras to capture images of barcodes and other scannable indicia. Electrically tunable variable focus lenses allow for auto-focusing of a barcode scanner on objects of interest (OOI) in machine vision and bar-code scanning applications. One drawback of electrically tunable variable focus lenses is that they do not provide any feedback signal indicative of a current focus, or current optical power, which can change over time due to ambient temperature variation, lens aging, voltage drift, and other factors. The change in the camera focus results in misreads or the inability of an autofocus camera to scan an OOI at a designated distance or range of distances. While many auto-focus camera systems remain flexible enough to be used in different applications, there are considerable operational delays as camera systems focus on different objects and different distances. For example, as the location of an OOI in a field of view changes, such as on a conveyer belt, an autofocusing scanner is often unable to discern the OOI from objects in the background and foreground. Furthermore, the need for accurate and fast focusing on varied objects adds considerable processing complexity and mechanical componentry to these camera systems, all of which increase costs.

Auto-focus cameras typically have lens apertures much larger than fixed focus systems. As a result, auto-focus cameras are known to have shallower depth of focus for any particular focus setting. For conventional scanning applications, the shallower depth of focus is not a problem as the system focuses on a barcode. In some environments of use, however, in particular the barcode scanning mode termed hands-free operation, there is typically not enough time for a conventional auto-focus camera system to focus fast enough to acquire an image of sufficient image focus quality to allow for accurate decoding of a barcode. In hands-free operation mode, the user or a conveyor system is swiping, dragging, or otherwise moving barcode objects in front of the barcode scanner at very high scan rates, scan rates that are at times (if not often) faster than the auto-focus time of the system. Furthermore, the working distance in a hands-free operation mode can be large, i.e., the distance range between the barcode reader and the plane of the barcode to be scanned can vary greatly from one object to the next. The larger the working distances, the longer it takes for the auto-focus camera system to focus over the entire working distance.

Accordingly, there is a need for focus stabilization imaging capture systems applicable to barcode readers.

SUMMARY

In an embodiment, the present invention is an imaging reader. The imaging reader includes a variable focus lens configured to receive light from an object of interest for imaging the object of interest; a controller communicatively coupled to the variable focus lens and configured to provide a voltage to the variable focus lens; an imaging sensor configured to receive an image of the object and to generate an electrical signal indicative of the received image; and a processor and computer-readable media. The computer-readable media stores machine readable instructions that, when executed, cause the focus stabilization imaging system to: obtain, by the processor, a calibration parameter value; obtain, by the imaging system, a first plurality of images of the object of interest, wherein each image of the first plurality of images is obtained by the imaging system at a different optical focus; identify, by the processor, a region of interest in at least one image of the first plurality of images, wherein the region of interest contains an indicia indicative of the object of interest; analyze, by the processor, each of the images of the first plurality of images at the region of interest; determine, by the processor, a set of image quality values from the analyzed images, wherein each of the image quality values of the set of image quality values corresponds to a respective analyzed image in the first plurality of images; determine, by the processor, a current alignment parameter value from at least one of the image quality values of the set of image quality values; determine, by the processor, a tuning parameter value by comparing the current alignment parameter value with the calibration parameter value; and tune, by the controller, the optical focus of the imaging system according to the tuning parameter. In some examples, In a variation of this embodiment, to obtaining the calibration parameter value, the imaging system may further be configured to obtaining, by the imaging system, a plurality of calibration images of an object of interest, wherein each image of the plurality of calibration images is obtained by the imaging system at a different optical focus; identifying, by the processor, a region of interest in at least one image of the plurality of calibration images, wherein the region of interest contains an indicia indicative of the object of interest; analyzing, by the processor, each of the images of the plurality of calibration images at the region of interest; determining, by the processor, a set of calibration image quality values from the analyzed images, wherein each of the calibration image quality values of the set of calibration image quality values corresponds to a respective image in the plurality of calibration images; and determining, by the processor, a calibration parameter value from at least one of the calibration image quality values of the set of calibration image quality values.

In more variations of the current embodiments, the calibration parameter value includes at least one of a sharpness value, a contrast value, or a spatial frequency content value, and the current alignment parameter value at least one of an image sharpness value, a contrast value, or a spatial frequency content value. In another variation of the current embodiments, the calibration parameter value is determined by a ratio between at least two of the image quality values of the set of calibration image quality values; and the current alignment parameter value is determined by a ratio between at least two of the image quality values of the set of image quality values of the first plurality of images.

In another embodiment the present invention is a computer-implemented method for focus stabilization of an imaging system. The method includes obtaining, by a processor, a calibration parameter value; obtaining, by the imaging system, a first plurality of images of an object of interest, wherein each image of the first plurality of images is obtained by the imaging system at a different optical focus; identifying, by the processor, a region of interest in at least one image of the first plurality of images, wherein the region of interest contains an indicia indicative of the object of interest; analyzing, by the processor, each of the images of the first plurality of images at the region of interest; determining, by the processor, a set of image quality values from the analyzed images, wherein each of the image quality values of the set of image quality values corresponds to a respective analyzed image in the first plurality of images; determining, by the processor, a current alignment parameter value from at least one of the image quality values of the set of image quality values; determining, by the processor, a tuning parameter value by comparing the alignment parameter value with the calibration parameter value; and tuning, by the processor, the imaging system according to the tuning parameter.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
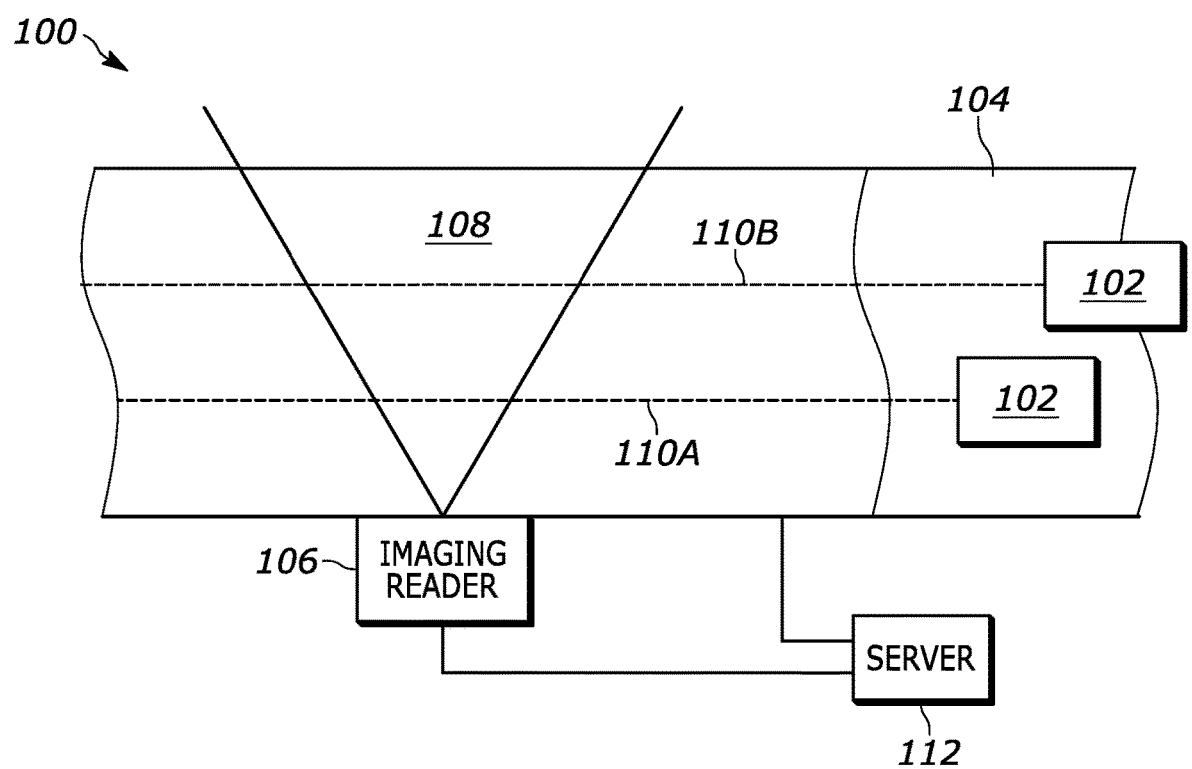
FIG. 1 illustrates a variable focus scanning station, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electrically controlled variable focus (VF) lenses are convenient, low-power solutions for fast auto-focus (AF) on objects of interests (OOI) in machine vision and bar-code applications. However, when location of objects of interest in the field of view varies (e.g., parts moving on conveyor, a person moving an object across a scanner field of view, etc.) an AF imaging system may be unable to determine the OOI, and may focus in the background or foreground of the desired focus plane. In such applications, it is desirable to keep focus plane constant. VF lenses do not provide any feedback signal indicating a current optical power or focus which can change after initial settings due to ambient temperature variation, aging, and other factors. The proposed system and method enable the focus stabilization of an imaging system utilizing a VF lens. The methods disclosed maintain the images captured by a VF imaging system within an image sharpness tolerance and thus allow for the implementation of VF technology for convenient initial electrical focus adjustments, which is particularly beneficial in compact imaging systems, and hard-to-reach places and scanning environments.

The disclosed system and method propose to stabilize image of VF lens by generating frame sequences with multiple focus planes. Some embodiments utilize three focus planes, near, middle, and far focal planes with the system having a near middle and far focus. The middle focus is set to a maximum image edge sharpness of an OOI during the camera set up. The near and far focus distances are also set during the camera set up based on a reduction in edge sharpness of the OOI image as compared to the middle focus frame. In embodiments, the near and far focus distances result in images having a 20-50% reduction in edge sharpness. In embodiments, another parameter other than image sharpness may be used to determine the near, middle, and far focus distances. More generally the parameter that is used to determine the optimal (i.e., middle) focus may be referred to herein as the "image quality value" for a given image. In embodiments, the image quality value may include one or more of a sharpness value, a contrast value, a spatial frequency content value, a noise measurement value, a dynamic range value, a measurement of image distortion, a blur value, another value associated with an image or image quality, or a value derived from a combination of any of these values. Further, the system and methods described may use one or more of the determined image quality values to further determine a tuning parameter. A controller may then use the tuning parameter to control a VF lens to reduce any focal distance drift of the VF lens, and to maintain focus at, or approximately at the middle focus plane. In embodiments, a range of focus values that are within a tolerance of an optimal focal value may be acceptable for decoding of indicia and identification of an OOI. For example, a middle focal plane may be at a focal distance of 2±1 cm, 4±2 cm, 5±3 cm, 8±4 cm, 10±5 cm, or another focal distance having a focal distance tolerance. In embodiments, the tolerance around a focal plane may be application dependent and therefore it may be advantageous for the focal tolerance to be input by an operator.

Referring now to the drawings, FIG. 1 illustrates an exemplary environment where embodiments of the present invention may be implemented, including the processes described and illustrated herein. In the present example, the environment is provided in the form of a scanning station 100 where goods 102 are moved across or along a scanning surface 104 and are scanned by an imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station is part of an inventory delivery system, where goods are conveyed by the scanning surface or across the scanning surface to monitor and control delivery of the goods, for example, shipping goods from a facility or receiving shipped goods to a facility.

The scanning surface 104 may be a stationary surface, such that the goods 102 are manually moved relative to the surface 104. In embodiments, the scanning surface 104 may move the goods 102 or be moved by another automated means. In other embodiments, the scanning surface 104 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 102 may be moved continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 at any distance from the imaging reader 106.

In some exemplary embodiments, the imaging reader 106 includes a variable focus imaging system, in which the reader 106 continuously scans for an object of interest (OOI) (such as the goods 102), in its field of view until the object, or a region of interest of the OOI (e.g., a barcode, serial number, other identifiers, etc.) is located and then brought sufficiently into focus on the imaging sensor. With at least some embodiments of the present invention, the imaging reader scans for the object (e.g., goods 102) only at discretized, determined distances, corresponding to imaging planes of the imaging reader 106. Instead of continuous scanning, the imaging reader 106 more quickly captures images at one or more predetermined imagining planes. The imaging planes are defined relative to the imaging reader 106. For illustration purposes, in FIG. 1 imaging planes happen to coincide with paths (e.g., 110A, 110B, etc.) over which the goods 102 traverse. Although, it is more likely the case that the imaging planes will not exactly coincide with the scan path of goods. While, in FIG. 1, the imaging reader 106 is depicted as being to the side of the goods 102, in embodiments, the imaging reader 106 may be positioned directly above the goods 102, above the goods 102 in front of or behind the goods 102 configured to image the OOI, or at another positon for imaging a region of interest of the goods 102 or any OOI. The imaging reader 106 captures images at each of the imaging planes, where the captured images of the good will vary in focus depending on where the good (and its scan path) is relative to the imaging reader 106. That is, the good will appear more in focus at some imaging planes in comparison to others. By capturing images of the goods at only certain imaging planes, the imaging reader 106 is able to identify the goods 102 much faster than a conventional autofocus system. Indeed, the imaging reader 106 can be configured such that if it has an autofocus operation that operation is disabled, and instead images are captured at specific imaging planes irrespective of which scan path the good traverses and without needing to continuously detect the good and autofocus onto the good. This operation greatly reduces power consumption demands on the imaging reader 106. As previously described, electrically tunable AF lenses may undergo focus plane drift due to environmental and other factors, which causes the defocusing of images of OOI reducing the efficacy of the VF imaging reader 106. As discussed further herein, the identification and scanning efficiencies can be increased having the imaging reader 106 actively stabilize the focus plane, or planes, of the goods 102 traversing the working range 102 of the imaging reader 106. The disclosed systems and methods enable the increased efficiency, and therefore reduced time required, for reading identifiers on an OOI, e.g., to identify an indicia or other barcode on the good. At least some of those scanning parameters, and/or calibration parameters described further herein, may be stored on a server 112 communicatively coupled to the imaging reader 106, and the imaging reader may retrieve the scanning parameters, or calibration parameters, from the server or another memory or form of storage.

Figure 2:
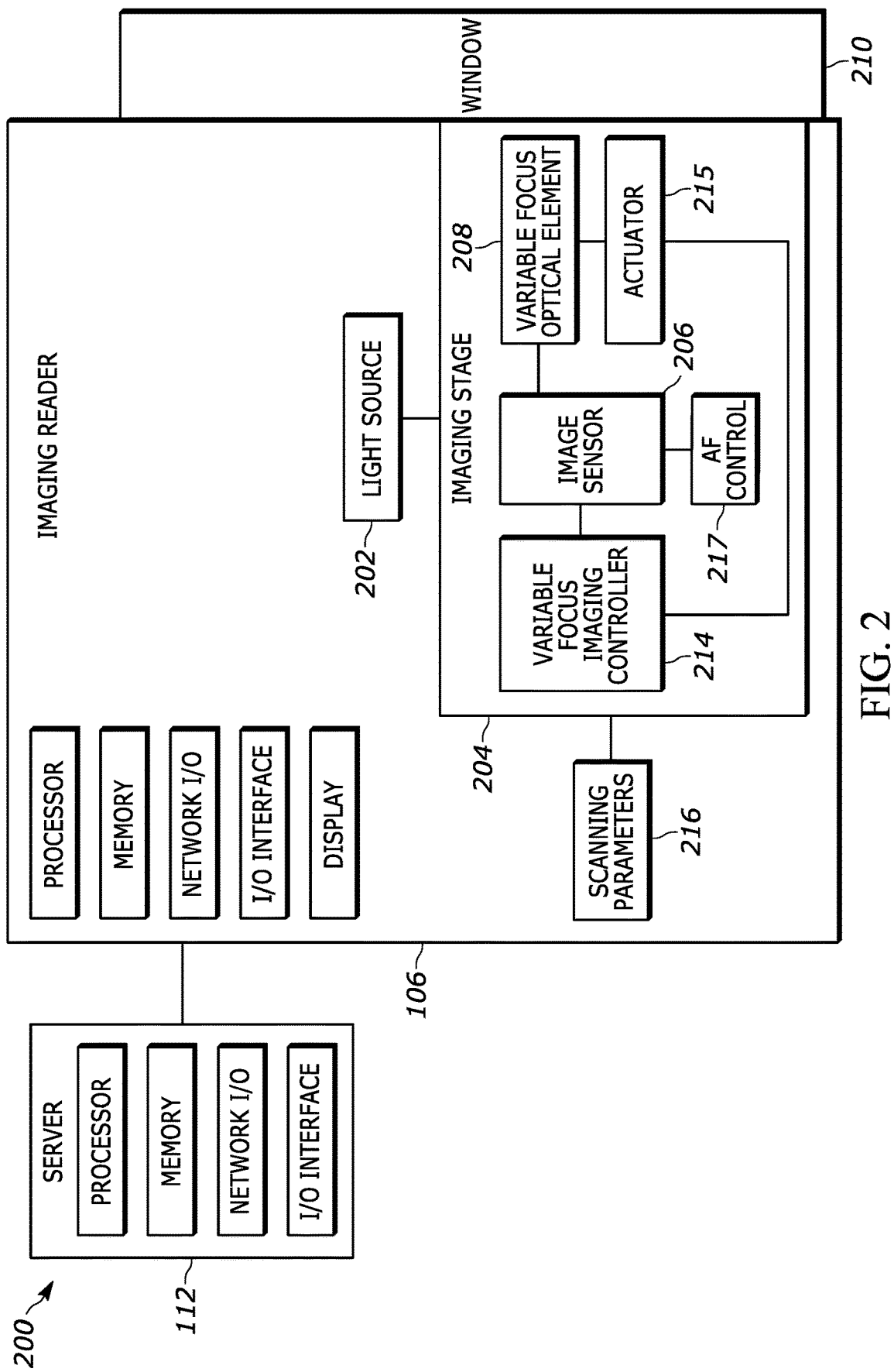
FIG. 2 is an exemplary block diagram schematic of an imaging reader of the variable focus scanning station of FIG. 1, in accordance with an embodiment of the present invention.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target, such as the goods 102 or another OOI, within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one or more discrete imaging planes for the imaging sensor. The one or more discrete imaging planes may be considered one or more middle focus planes as described here. As previously described, a middle focus plane is the imaging plane that is expected to result in the greatest image edge sharpness value.

In the illustrated example, the controller 214 is coupled to the variable focusing optical element 208 through an actuator control unit 215 and bypasses an optional autofocus control unit 217, thereby providing faster image capture at the desired imaging planes by overriding the slower autofocus control units of conventional systems. In exemplary embodiments, the imaging reader 106 does not have an autofocus control unit or any autofocus functionality. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc.

The VF optical element 208 may be a deformable lens element, a liquid lens, a T-lens or another VF optical element. In some embodiments, the optical element includes a voice coil actuator motor in the actuator 215 that is controllably adjusted by the controller 214. In exemplary embodiments, such as some barcode scanning applications, the VF optical element 208 has an aperture from 1.5 mm to 3 mm. In some embodiments, the image stage 204 is implemented as part of a VF camera assembly.

In exemplary embodiments, the VF imaging controller 214 is configured to access one or more scanning parameters 216 stored in the imaging reader 106, stored on the server 112, or stored on another medium. From these scanning parameters 216, the controller 214 determines the number of discrete middle imaging planes at which the imaging reader 106 scans for and captures images of the target or an OOI (such as goods 102). The controller 214 further determines the distance of each of those middle imaging planes, as measured from the imaging sensor 206. The controller 214, for example, may determine the number and distance of the middle imaging planes so that the entire working range 108 is covered by five (5) or fewer imaging planes. In some examples, depending on the scanning parameters 216, the number of middle imaging planes may be three (3) or fewer.

The imaging controller 214 converts these determined middle imaging planes and middle focus distances into parameters or instructions for controlling the actuator 215 for controlling the variable focus optical element 208.

In exemplary embodiments, the variable focus imaging controller 214 has hands-free mode in which the variable focus optical element 208 and the imaging sensor 206 are controlled to capture an image of the target at each of the middle imaging planes within the working range in an ordered manner to form a set of captured images of the target, stored in the memory. In some embodiments, that ordered manner is a sequential order, such as from nearest middle imaging plane to farthest or vice versa, as measured from the imaging sensor 206.

In some exemplary embodiments, the imaging reader 106 is implemented in a handheld bar code scanner device, such as shown in FIG. 7. When the handheld scanner is placed within a stationary cradle thereby establishing an upright scanning position, the handheld scanner may automatically sense that placement and enter the hands-free mode. In other exemplary embodiments, the imaging reader 106 is implemented as a multi-plane scanner, such as a bioptic scanner as shown in FIG. 3.

In exemplary embodiments, the variable focus optical element 208 is discretely controlled to hop to each middle imaging plane, avoiding a sweeping operation between imaging planes.

In embodiments, the imaging sensor 112 may be a charge coupled device, or another solid-state imaging device. The imaging sensor 112 may be a one megapixel sensor with pixels of approximately three microns in size. In embodiments, the imaging sensor includes 3 millimeter pixels, having a total of about 2 megapixels, resulting in an overall imaging sensor width and length of 3 microns in each dimension. In embodiments, the lens assembly is configured to capture images with a modulation transfer function of 40% at 160 line pairs per millimeter.

Figure 3:
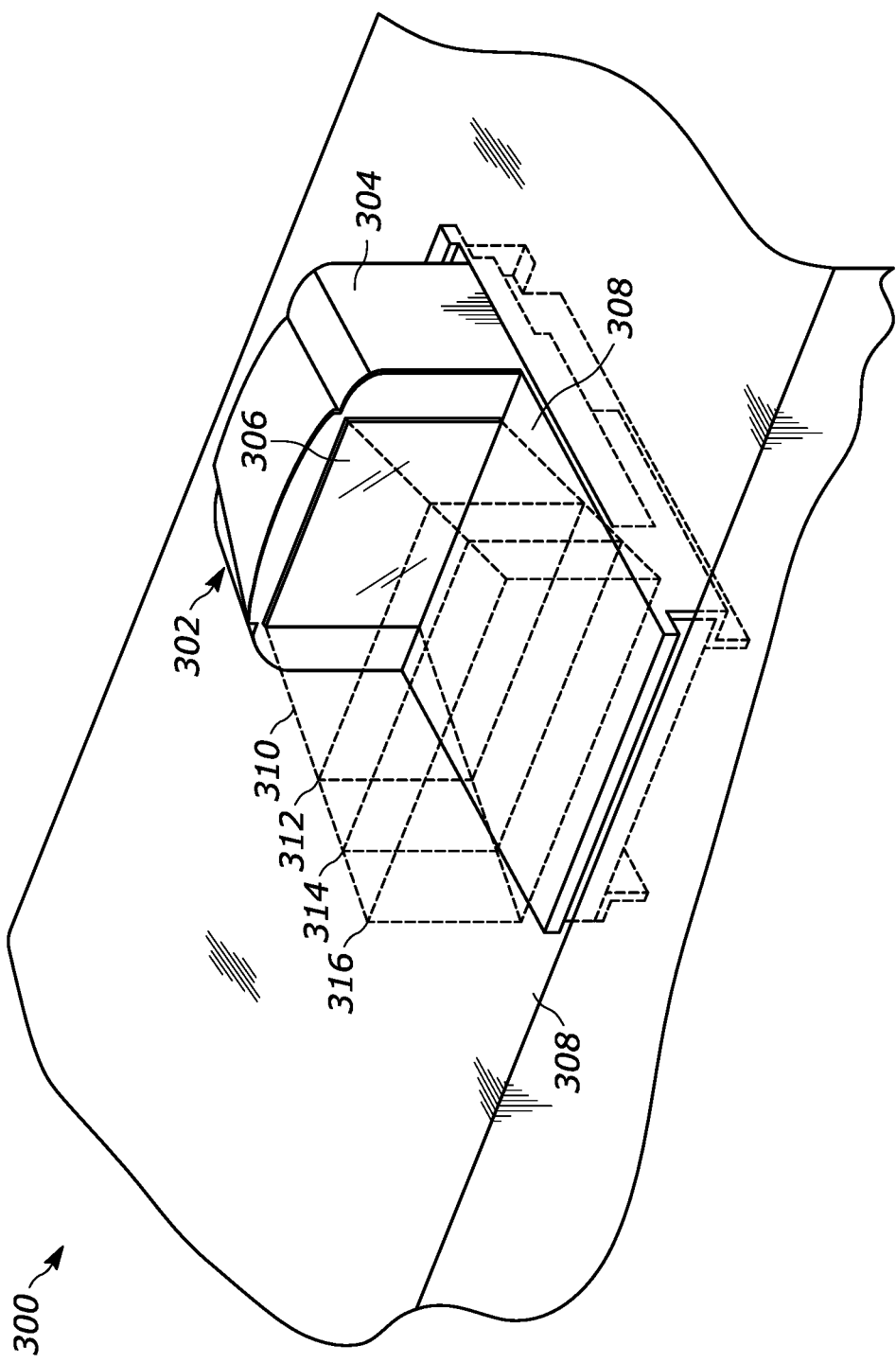
FIG. 3 illustrates a perspective view of another variable focus scanning station with variable determined imaging planes, in accordance with an embodiment of the present invention.

FIG. 3 illustrates an exemplary scanning station 300 having an imaging reader 302, in the form of a bioptic scanner, having a housing 304 and a first scanning window 306 behind which is an illumination source (not shown) and an imaging stage (not shown) like that of FIG. 2. The imaging reader 302 is positioned adjacent a scanning surface 308 and defines a horizontally and vertically extending working range 310 illuminated by the imaging reader 302 and having defined therein 3 defined middle imaging planes 312, 314, and 316 at which the imaging reader 302 captures images of an object for identification and imaging. For clarity and simplicity, a single middle imaging plane will be further used in descriptions of the systems and methods for focus stabilization of variable focus imaging systems. It should be understood that the systems and methods are not limited to a single middle imaging plane, and that the disclosed systems and methods may be applied for focus stabilization for any number of focus imaging planes as practicable by the limitations (i.e., imaging camera resolution, imaging system working range, illumination capabilities, etc.) of the imaging system.

Figure 4:
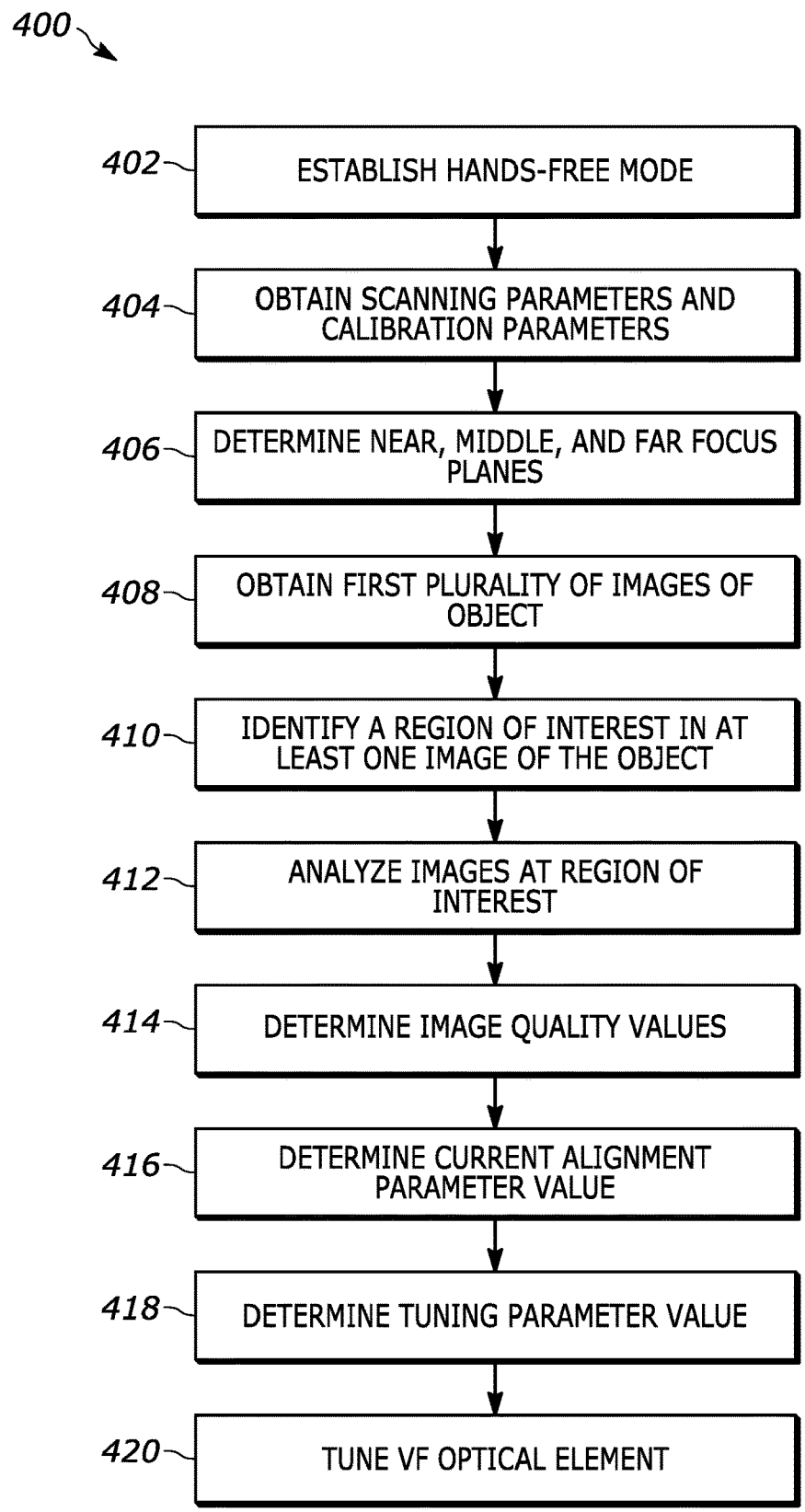
FIG. 4 is a flowchart representative of a method for performing focus stabilization with swipe scanning which may be implemented in systems exhibiting a small image sharpness tolerance.

FIG. 4 illustrates a method 400 of performing focus stabilization with swipe scanning in accordance with an embodiment of the present invention. Method 400 may be implemented in systems exhibiting a small image sharpness tolerance (i.e. a required minimum sharpness is less than 20% of the maximum image sharpness), systems with a relatively a slow conveyor speeds, and/or relatively low image frame rates wherein several non-decoded frames are acceptable while maintaining a 100% decode rate, resulting in identification and decoding of indicia indicative of all OOIs. The method 400 may be implemented by the imaging reader of any of FIGS. 1-3, for example. In the example of a handheld scanner, initially, the imaging reader enters a hands-free mode at 402 indicating that swipe scanning is to be performed. In some examples, the handheld scanner includes a trigger on or near a handle, and the trigger, when depressed, enters the scanner into the hands-free mode for swipe scanning. In some embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIG. 1. Therefore, the imaging scanner of FIG. 1 may operate mainly in the hands-free mode, and a manual mode may be activated for manual scanning and/or calibration purposes.

The imaging reader obtains scanning parameters and calibration parameters at 404. In exemplary embodiments, the scanning parameters include frame rate of the image sensor of the imaging reader, exposure time of that image sensor, the aperture or aperture range of the variable focus optical element, the swipe speed of movement of the target, an automatic movement speed of a conveyer belt or other speed of a means for automatic swiping, a size of the working distance, a nearest distance of the working distance, a farthest distance of the working distance, and/or focusing time of the variable focus optical element. Such parameters may be stored within the imaging reader, for example.

In some embodiments, the scanning parameters are target specific parameters, such as the types and/or sizes of the targets to be scanned. In some embodiments, the scanning parameters include the types of indicia on the targets, such as whether the targets contain 1D or 2D barcodes, QR codes, UPC codes, or other identifying indicia.

In some embodiments, the calibration parameters may include defocus parameters, near focus plane parameters, middle focus plane parameters, and far focus plane parameters. In some embodiments, the calibration parameters may include scanning parameters for determining the near, middle, and far focus planes. In some embodiments, the calibration parameters may be a subset of the obtained scanning parameters. In some examples, some scanning parameters and calibration parameters are obtained from the imaging reader communicating with a server, such as the server 112, which may include an inventory control manager that access information on targets and OOIs.

The variable focus imaging controller, at 406, assesses the scanning parameters and determines a near focus plane, middle focus plane, and a far focus plane, each having its own respective optical focus determined by the controller. The near focus plane, middle focus plane, and far focus planes are three imaging planes at which the imaging reader will capture images of the target during focus stabilization of the VF imaging reader. In some embodiments, the scanning parameters may include parameters for determining more than three focus planes for stabilization of the autofocusing imaging system.

In some embodiments, at 406, the process determines the near and far focus planes based on the length of the working distance, by establishing sufficient distances of imaging planes from the middle focus plane, a desired, or required, defocusing of images at the near and far focus planes can be established for performing stabilization of the VF imaging reader. The near and far focus distances may be determined by the speed of a swipe (i.e., manual swipe, automatic swipe, etc.) of an OOI through working range of the imaging reader. For example, in some embodiments, the process, at 406, may access the speed by which the target moves across the working range. If the target speed is faster than a threshold speed, then less image planes may be used for performing focus stabilization. At high target speeds, greater numbers of images may not capture any portion of the target or they would capture only a portion of the target, rendering some of the images useless for focus stabilization. For clarity and simplicity, three focus planes, i.e. near, middle and far focus planes, will be used to describe the focus stabilization systems and methods described here.

The controller 214 controls the imaging sensor 206, at 408, to capture a first plurality of images of a target or OOI. The first plurality of images including a first image at the near focus plane, a second image at the middle focus plane, and a third image at the far focus plane. In embodiments, the order of the images being captured at the different focus planes may change. For example, the image sensor may first capture the far focus plan image, then the middle, then the near, or any other permutation of the order of the images captured at the different focus planes. The controller, at 410, identifies a region of interest in at least one of the captured images. The region of interest in the at least one image may include a barcode, a serial number, alphanumeric, a graphic, or another indicia indicative of the target or OOI.

At 412, the processor of the imaging reader 106 analyzes each of the first plurality of images in the identified region of interest, and, at 414, the processor determines a set of image quality values from the analyzed images. Each of the set of image quality values corresponds to a respective analyzed image in the first plurality of images. For example, at 412, the processor may analyze each of the first plurality of images by performing image processing on each of the plurality of images. The image processing may include applying a spatial lowpass filter, spatial highpass filter, Fourier lowpass or highpass filter, performing a noise reduction, a scaling, rotation, shearing, reflection, or another image filtering or image processing technique. Additionally, analyzing each of the first plurality of images, and determining, at 414, the image quality values for each of the first plurality of images may include determining a sharpness value, a contrast value, a spatial frequency content value, a noise measurement value, a dynamic range value, a measurement of image distortion, a blur value, or another value associated with an image or image quality.

Figure 5A:
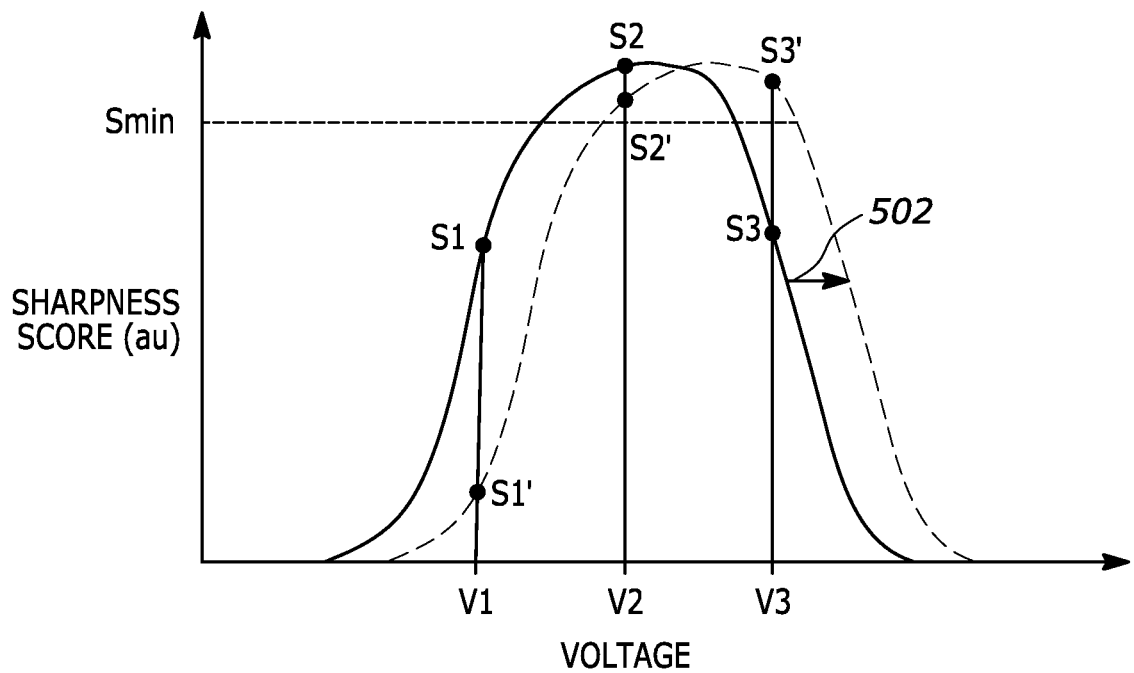
FIG. 5A is a plot of sharpness score versus control voltage representing the focus shift of an imaging reader.
Figure 5B:
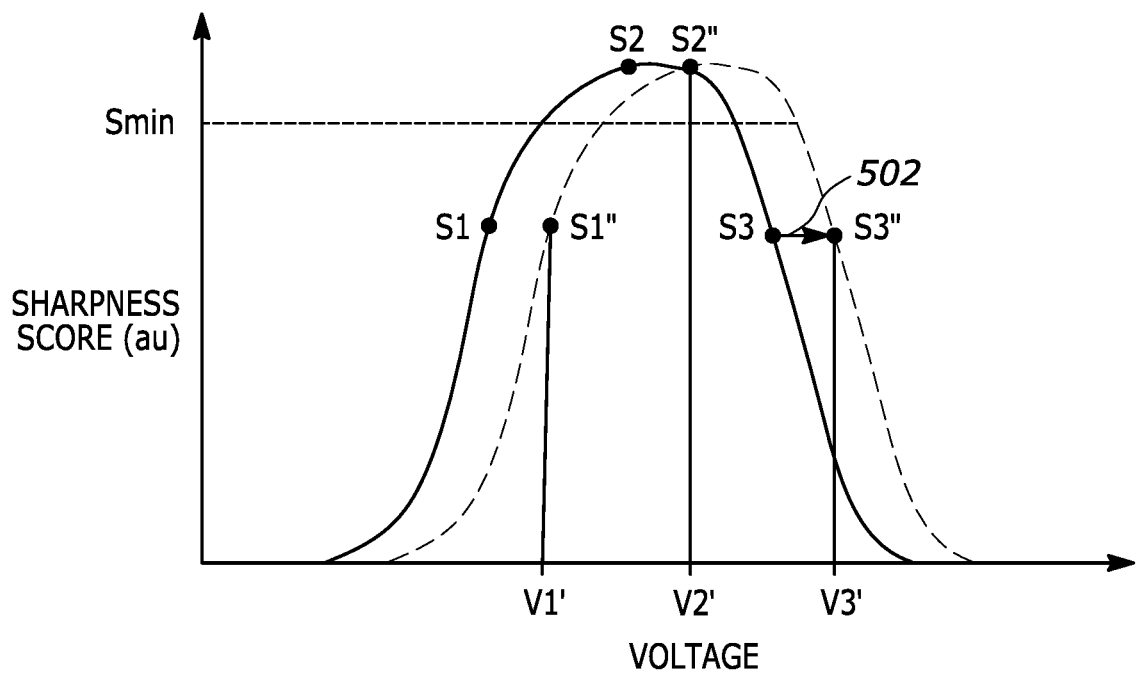
FIG. 5B is a plot for sharpness score versus control voltage representing a focus correction on an imaging reader according to the method of FIG. 4.

The description of method 400 of FIG. 4 is continued with additional reference to FIGS. 5A and 5B for clarity. FIGS. 5A and 5B are plots of sharpness score versus control voltage. The control voltage is a voltage value applied to the VF optical element, and therefore the control voltage is indicative of a focal distance, and focus plane of the imaging reader. For example, the control voltages $V_1$, $V_2$, and $V_3$ respectively correspond to the focus planes of the first image (near focus), second image (middle focus), and third image (far focus). The dotted curve of FIG. 5A represents a focus shift of the imaging reader, and the dotted line $S_{min}$ is a minimum sharpness value for decoding, both of which will be discussed shortly in more detail.

Referring simultaneously to FIGS. 4 and 5A, the method 400 further includes the processor determining, at 416, a current alignment parameter of the imaging reader. The current alignment parameter is determined from at least one of the image quality values of the set of image quality values. For example, a sharpness value of the middle focus image may be used as the current alignment parameter, or a maximum sharpness value of the three image quality values may be determined to be the current alignment parameter. In an embodiment, the current alignment parameter may be determined to be a ratio of two or more of the image quality values of the set of image quality values. For example, the set of image quality values may include sharpness values $S_1$, $S_2$, and $S_3$, corresponding to the first image (near focus), second image (middle focus), and third image (far focus), respectively, as illustrated in FIG. 5A). In such an embodiment, the second images sharpness value $S_2$ may be above the sharpness threshold, $S_{min}$, for decoding of indicia in the image, and therefore the second image may be the preferred image for analyzing and decoding of indicia in the region of interest. The sharpness threshold may be a minimum sharpness value that is required for decoding of indicia in an image. The sharpness values $S_1$ and $S_3$ of the first and third images of the plurality of images may be below $S_{min}$, and therefore, the first and third images may not be suitable for efficient decoding of the indicia. In embodiments, the image sharpness values $S_1$, and $S_3$ may be less than 20%, less than 15%, less than 10%, or less than 5% less than the maximum sharpness value. Although, the image quality values $S_1$ and $S_3$ may be used for determining the current alignment parameter value. The current alignment parameter value may be determined to be a ratio of $S_1$ and $S_3$. For example, the sharpness ratio $S_3/S_1$ may be determined to be the current alignment parameter. In embodiments the maximum sharpness value may be a current middle focus plane sharpness value $S_2$. In some embodiments, the maximum sharpness value may be a maximum sharpness of a sharpness versus voltage curve such as the solid curve illustrated in FIG. 5A. In embodiments, the sharpness threshold minimum may be determined by the type of indicia being decoded, and/or by the optical and processing capabilities of the imaging reader, e.g. camera resolution, frame rate, image contrast, f-number, available image processing techniques, illumination sources, etc.

At 418, the processor of the imaging reader 106 determines a tuning parameter by comparing the current alignment parameter with the calibration parameter obtained at 404. In embodiments, the calibration parameter may be a sharpness ratio $S_3/S_1$, and it may be determined that the calibration parameter value is equal to 1. Meaning, if the current alignment parameter value is equal to 1, then no re-alignment or tuning of the VF optical element is required. As illustrated in FIG. 5A, if both the near focus and far focus are equally defocused from the middle focus then the sharpness values $S_1$ and $S_3$ should be roughly equal. Therefore, the sharpness ratio $S_3/S_1$ should be close to a value of 1. Therefore, the obtained calibration parameter value may be a sharpness ratio value of 1, or a value within a threshold. For example, the calibration parameter value may be a sharpness ratio value of 1±0.05, 1±0.1, 1±0.2, 1±0.4, 1±0.6, or another sharpness ratio value and tolerance. A deviation of the sharpness ratio from a value of 1, or a tolerance range thereof, indicates that the focus of the imaging system has shifted or drifted over time, and that the VF optical element should be tuned to compensate for the deviation. As shown by the arrow 502 and dotted curve in FIG. 5A, if the optical power of the VF optical element decreases, causing a focus plane shift, the sharpness versus voltage curve shifts to the right. The shift results in a reduced first image sharpness, $S_1'$, slightly reduced second image sharpness $S_2'$, and an increased third image sharpness $S_3'$. Therefore, the sharpness ratio $S_3/S_1$ increases to the value $S_3'/S_1'$.

As described, at 418, the processor of the imaging reader 106 compares the determined current alignment parameter, i.e., the sharpness value $S_3'/S_1'$, to the calibration parameter value of 1 to determine the tuning parameter. In the example of FIG. 5B, a larger voltage is required to shift the focus to achieve sharpnesses approximately equal to the original $S_1$, $S_2$, and $S_3$ values at the near, middle, and far focus planes. As illustrated by the arrow 502 and the dotted curve in FIG. 5B, the controller (214), at 420, increases the voltages provided to the VF optical element to new values of $V_1'$, $V_2'$, and $V_3'$ resulting in images having new sharpness values of $S_1''$, $S_2''$, and $S_3''$. The controller increases the provided voltage values until the current sharpness ratio value $S_3''/S_1''$ returns to the value $S_3/S_1$, a value within a threshold of $S_3/S_1$, or a value within a threshold of the calibration parameter value. Alternatively, if the optical power of adaptive lens increases, the sharpness versus voltage curve shifts to the left. Therefore the sharpness ratio decreases to less than the original value $S_3/S_1$, and the controller, at 420, instructs the VF optical element to decrease the applied voltages until the new sharpness ration returns to the original value $S_3/S_1$, within a threshold of $S_3/S_1$, or within a threshold of the calibration parameter value. In embodiments, it may be required that the sharpness ratio deviate beyond a value of 1±0.05, 1±0.1, 1±0.2, 1±0.4, or 1±0.6 before any correction or tuning parameter be determined and applied to the VF optical element.

While the blocks 402-420 are described as performed by various elements in the imaging reader device, any of these steps may be performed in a controller or a processor, whether through one or more dedicated controllers or processors or one or more elements that are configured to perform other processes described herein. Additionally, the controller 214 may include one or more processors and one or more memoires.

Figure 6:
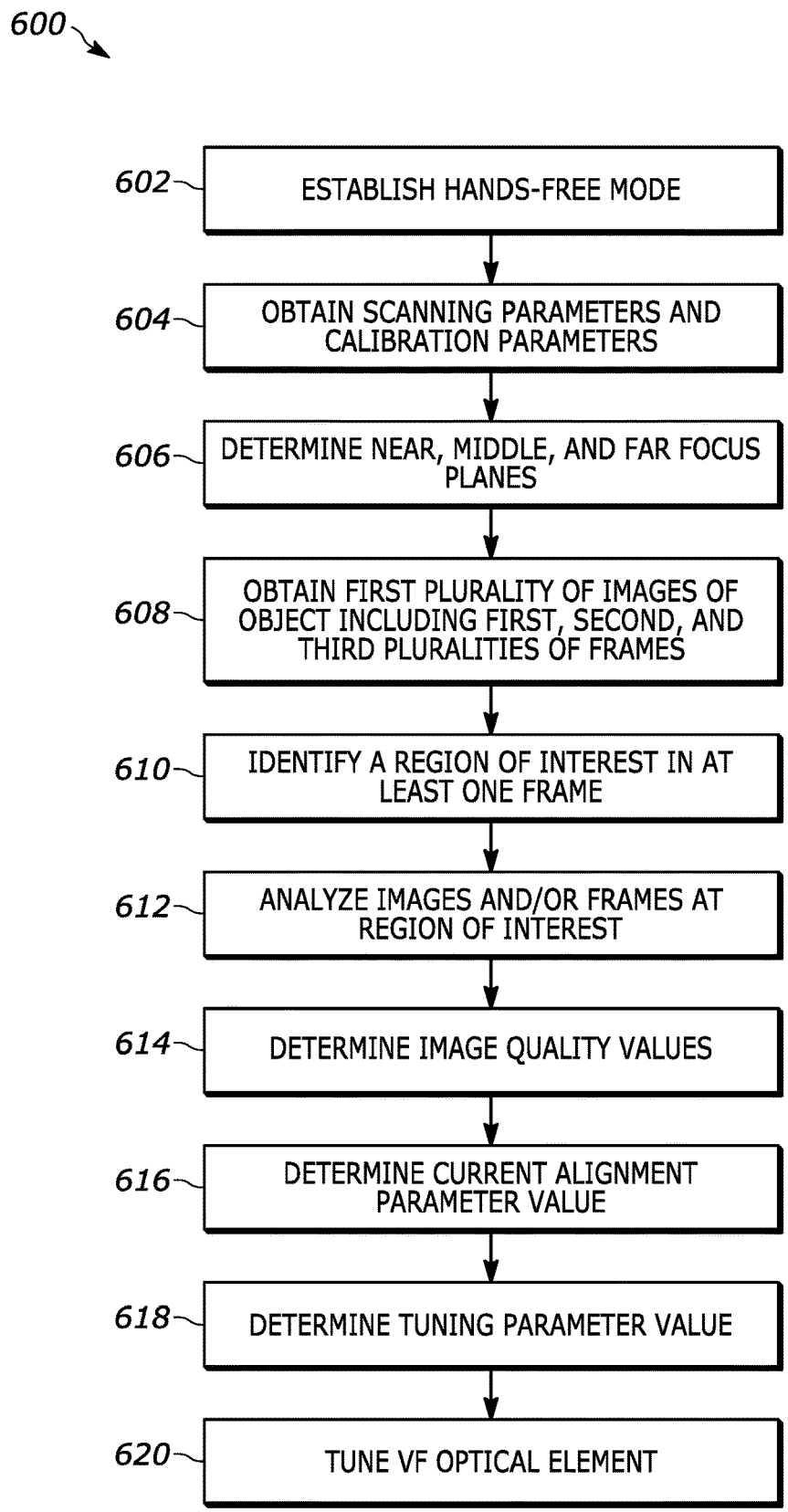
FIG. 6 is a flowchart representative of a method for performing focus stabilization with swipe scanning which may be implemented in systems requiring 100% decoding efficiency.

FIG. 6 illustrates another method 600 of performing focus stabilization with swipe scanning in accordance with an embodiment of the present invention. At high conveyer, high swipe speeds, and/or low frame rate imaging systems it is not desirable to lose any frames for decoding to preserve a 100% decoding of indicia, and 100% OOI identification. The method 600 may be implemented in systems that can decode indicia at a greater drop of image sharpness, i.e. a sharpness decrease of greater than 20% from the sharpness value maximum. The method 600 may be implemented by the imaging reader of any of FIGS. 1-3, for example. In the example of a handheld scanner, initially, the imaging reader enters a hands-free mode at 602 indicating that swipe scanning is to be performed. In some examples, the handheld scanner includes a trigger on or near a handle, and the trigger, when depressed, enters the scanner into the hands-free mode for swipe scanning. In some embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIG. 1. Therefore, the imaging scanner of FIG. 1 may operate mainly in the hands-free mode, and a manual mode may be activated for manual scanning and/or calibration purposes.

The imaging reader obtains scanning parameters and calibration parameters at 604. In exemplary embodiments, the scanning parameters include frame rate of the image sensor of the imaging reader, exposure time of that image sensor, the aperture or aperture range of the variable focus optical element, the swipe speed of movement of the target, an automatic movement speed of a conveyer belt or other speed of a means for automatic swiping, a size of the working distance, a nearest distance of the working distance, a farthest distance of the working distance, and/or focusing time of the variable focus optical element. Such parameters may be stored within the imaging reader, for example.

In some embodiments, the scanning parameters are target specific parameters, such as the types and/or sizes of the targets to be scanned. In some embodiments, the scanning parameters include the types of indicia on the targets, such as whether the targets contain 1D or 2D barcodes, QR codes, UPC codes, or other identifying indicia.

In some embodiments, the calibration parameters may include defocus parameters, near focus plane parameters, middle focus plane parameters, and far focus plane parameters. In some embodiments, the calibration parameters may include scanning parameters for determining the near, middle, and far focus planes. In some embodiments, the calibration parameters may be a subset of the obtained scanning parameters. In some examples, some scanning parameters and calibration parameters are obtained from the imaging reader communicating with a server, such as the server 112, which may include an inventory control manager that access information on targets and OOIs.

The variable focus imaging controller, at 606, assesses the scanning parameters and determines a near focus plane, middle focus plane, and a far focus plane, each having its own respective optical focus determined by the controller. The near focus plane, middle focus plane, and far focus planes are three imaging planes at which the imaging reader will capture images of the target during focus stabilization of the VF imaging reader. In some embodiments, the scanning parameters may include parameters for determining more than three focus planes for stabilization of the autofocusing imaging system.

In some embodiments, at 606, the process determines the near and far focus planes based on the length of the working distance, by establishing sufficient distances of imaging planes from the middle focus plane, a desired, or required, defocusing of images at the near and far focus planes can be established for performing stabilization of the VF imaging reader. The near and far focus distances may be determined by the speed of a swipe (i.e., manual swipe, automatic swipe, etc.) of an OOI through working range of the imaging reader. For example, in some embodiments, the process, at 606, may access the speed by which the target moves across the working range. If the target speed is faster than a threshold speed, then less image planes may be used for performing focus stabilization. At high target speeds, greater numbers of images may not capture any portion of the target or they would capture only a portion of the target, rendering some of the images useless for focus stabilization. For clarity and simplicity, three focus planes, i.e. near, middle and far focus planes, will be used to describe the focus stabilization systems and methods described here.

The controller 214 controls the imaging sensor 206, at 608, to capture a first plurality of images of a target or OOI. The first plurality of images including a first image including a first plurality of frames at the near focus plane, a second image including a second plurality of frames at the middle focus plane, and a third image including a third plurality of frames at the far focus plane. In embodiments, the order of the first, second, and third pluralities of frames being captured at the different focus planes may change. For example, the image sensor may first capture the far focus plane frames, then the middle frames, then the near frames, or any other permutation of the order of the pluralities of frames captured at the different focus planes. The controller or a processor, at 610, identifies a region of interest in at least one of the captured frames. The region of interest in the at least one image may include a barcode, a serial number, alphanumeric, a graphic, or another indicia indicative of the target or OOI. In embodiments, the processor may identify the region of interest from performing image processing on one or more of the frames of one of the pluralities of frames. For example, the processor may perform an averaging of pixel values across each of the frames of the first plurality of frames of the first image to further analyze and identify the region of interest.

The processor, at 612, analyzes each of the first plurality of images in the identified region of interest, and, at 614, the processor determines a set of image quality values from the analyzed images. Each of the set of image quality values corresponds to a respective analyzed image in the first plurality of images. For example, at 612, the processor may analyze each of the first plurality of images by performing image processing on each of the plurality of images. In the present embodiment, the processor may perform image processing on the first plurality of frames, the second plurality of frames, and the third plurality of frames to generate the first image, second image, and third image respectively. In embodiments, the processor may determine the set of image quality values from one or more of the plurality of frames of each of the first, second, and third pluralities of frames. In some embodiments, the processor may determine the set of image quality values from the first, second, and third images of the first plurality of images. In an embodiment, the processor may determine a "best" frame of each of the first, second, and third pluralities of frames for use as the first, second, and third images respectively. The best frame may be determined by a frame sharpness value, blur value, contrast value, spatial frequency content value, a noise value, a dynamic range value, or another value associated with image or image quality. Image processing may include applying a spatial lowpass filter, spatial highpass filter, Fourier lowpass filter, Fourier highpass filter, performing a noise reduction, a scaling, rotation, shearing, reflection, or another image filtering or image processing technique. Additionally, analyzing each of the first plurality of images, and determining, at 614, the image quality values for each of the first plurality of images may include determining a sharpness value, a contrast value, a spatial frequency content value, a noise measurement value, a dynamic range value, a measurement of image distortion, a blur value, or another value associated with an image or image quality.

Figure 7A:
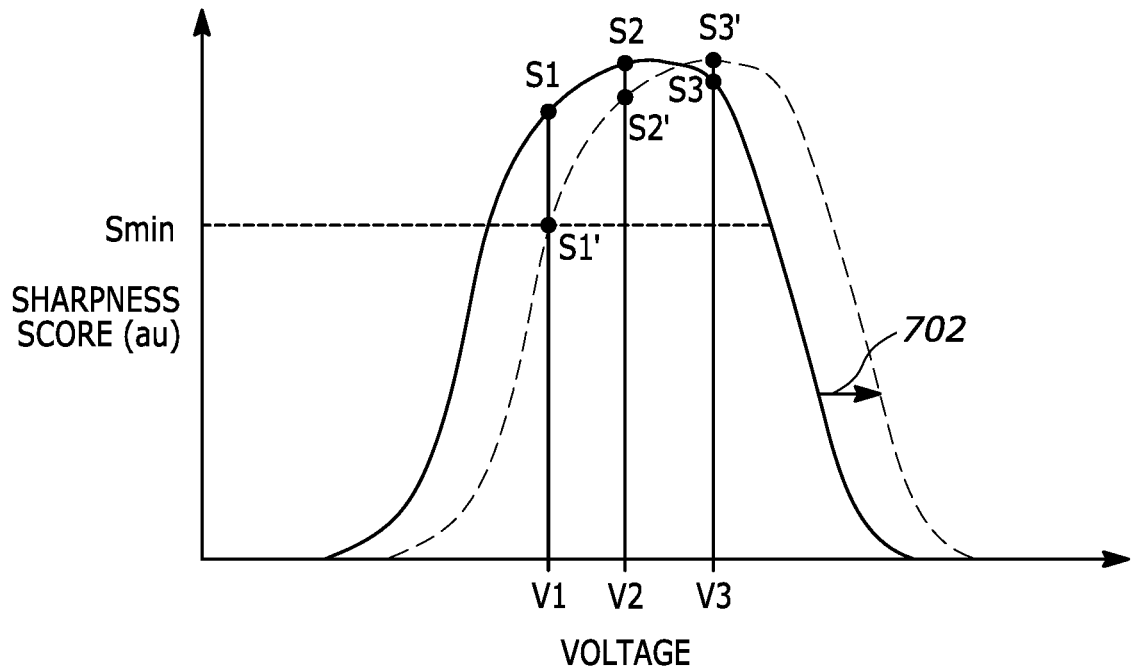
FIG. 7A is a plot of sharpness score versus control voltage representing the focus shift of an imaging reader.
Figure 7B:
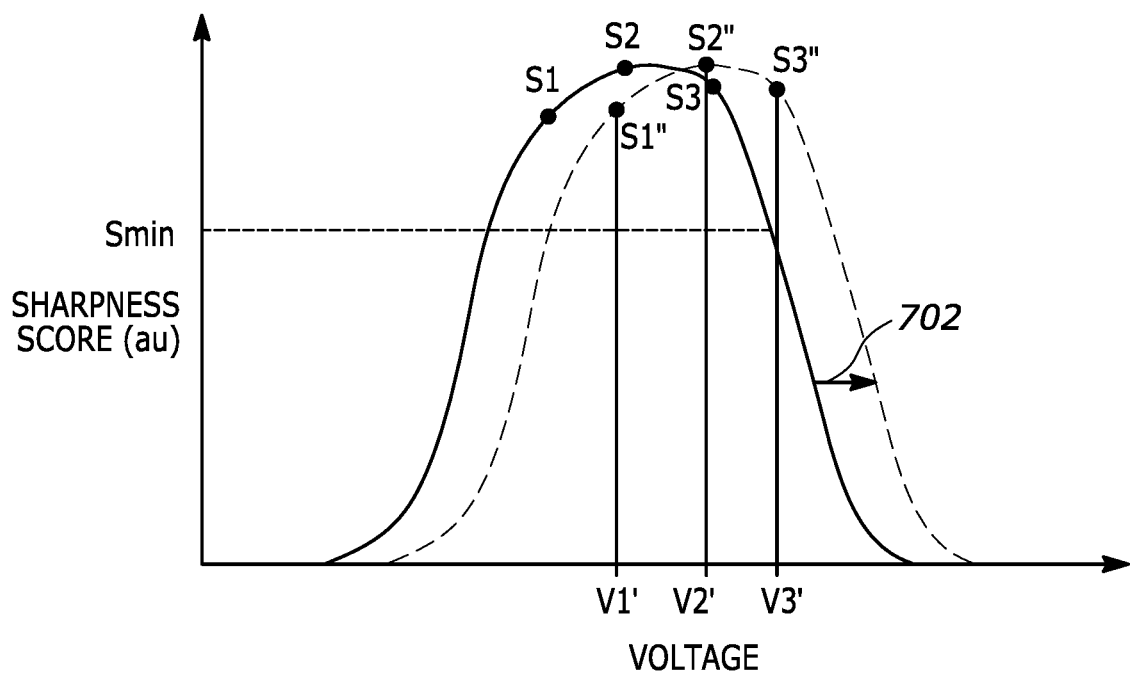
FIG. 7B is a plot for sharpness score versus control voltage representing a focus correction on an imaging reader according to the method of FIG. 6.

The description of method 600 of FIG. 6 is continued with additional reference to FIGS. 7A and 7B for clarity. FIGS. 7A and 7B are plots of sharpness score versus control voltage. The control voltage is a voltage value applied to the VF optical element, and therefore the control voltage is indicative of a focal distance, and focus plane of the imaging reader. For example, the control voltages $V_1$, $V_2$, and $V_3$ respectively correspond to the focus planes of the first image (near focus), second image (middle focus), and third image (far focus). The dotted curve of FIG. 7A represents a focus shift of the imaging reader, and the dotted line $S_{min}$ is a minimum sharpness value for decoding, both of which will be discussed shortly in more detail. While similar to the plots of FIGS. 5A and 5B, it should be noted that the minimum sharpness value $S_{min}$ of FIGS. 7A and 7B is lower than the minimum sharpness level of FIGS. 5A and 5B. Therefore, the imaging reader of FIGS. 7A and 7B allows for more reduction of sharpness, and therefore a greater sharpness tolerance while maintaining a 100% indicia decode rate. As such, image sharpness values $S_1$, $S_2$, and $S_3$ at the near, middle, and far focus planes respectively, enable the decoding of indicia, which is not achieved in the scenario of FIGS. 5A and 5B where only the image with sharpness $S_2$ is above the required minimum sharpness threshold value.

Referring simultaneously to FIGS. 6 and 7A, the method 600 further includes the processor determining, at 616, a current alignment parameter of the imaging reader. The current alignment parameter is determined from at least one of the image quality values of the set of image quality values. The sharpness value $S_2$ of the middle focus image may be used as the current alignment parameter, or a maximum sharpness value of the three image quality values may be determined to be the current alignment parameter. In an embodiment, the current alignment parameter may be determined to be a ratio of two or more of the image quality values of the set of image quality values. For example, the set of image quality values may include sharpness values $S_1$, $S_2$, and $S_3$, corresponding to the first image (near focus), second image (middle focus), and third image (far focus). All of the sharpness values may be greater than the sharpness threshold $S_{min}$ for decoding of indicia in the image. In addition to decoding indicia in the region of interest, the first and third sharpness values of the first and third images, $S_1$ and $S_3$, may be used for determining the current alignment parameter value. The current alignment parameter value may be determined to be a ratio of $S_1$ and $S_3$. For example, the sharpness ratio $S_3/S_1$ may be determined to be the current alignment parameter. In embodiments, the sharpness threshold may be a value mare than 15%, more than 20% more than 30%, more than 40%, between 20% and 50%, or more than 50% less than the maximum sharpness value. In embodiments the maximum sharpness value may be the current middle focus plane sharpness value $S_2$. In some embodiments, the maximum sharpness value may be a maximum sharpness of a sharpness versus voltage curve such as the solid curve illustrated in FIG. 7A. In embodiments, the sharpness threshold minimum may be determined by the type of indicia being decoded, and/or by the optical and processing capabilities of the imaging reader, e.g. camera resolution, frame rate, image contrast, f-number, available image processing techniques, illumination sources, etc.

The processor, at 618, determines a tuning parameter by comparing the current alignment parameter with the calibration parameter obtained at 604. In embodiments, the calibration parameter may be a sharpness ratio $S_3/S_1$, and it may be determined that the calibration parameter value is equal to 1. Meaning, if the current alignment parameter value is equal to 1, then no re-alignment or tuning of the VF optical element is required. As illustrated in FIG. 7A, if both the near focus and far focus are equally defocused from the middle focus then the sharpness values $S_1$ and $S_3$ should be roughly equal. Therefore, the sharpness ratio $S_3/S_1$ should be close to a value of 1. Therefore, the obtained calibration parameter value may be a sharpness ratio value of 1, or a value within a threshold. For example, the calibration parameter value may be a sharpness ratio value of 1±0.05, 1±0.1, 1±0.2, 1±0.4, 1±0.6, or another sharpness ratio value and tolerance. A deviation of the sharpness ratio from a value of 1, or from a tolerance range thereof, indicates that the focus of the imaging system has shifted or drifted over time, and that the VF optical element should be tuned to compensate for the deviation. As shown by the arrow 702 and dotted curve in FIG. 7A, if the optical power of the VF optical element decreases, causing a focus plane shift, the sharpness versus voltage curve shifts to the right. The shift results in a reduced first image sharpness, $S_1'$, slightly reduced second image sharpness $S_2'$, and an increased third image sharpness $S_3'$. Therefore, the sharpness ratio $S_3/S_1$ increases to the value $S_3'/S_1'$.

As described, at 718 the processor compares the determined current alignment parameter, i.e., the sharpness value $S_3'/S_1'$, to the calibration parameter value of 1 to determine the tuning parameter. In the example of FIG. 7B, a larger voltage is required to shift the focus to achieve sharpnesses approximately equal to the original $S_1$, $S_2$, and $S_3$ values at the near, middle, and far focus planes. As illustrated in FIG. 5B, the controller, at 620, increases the voltages provided to the VF optical element to new values of $V_1'$, $V_2'$, and $V_3'$, causing the curve to shift by the amount indicated by the arrow 702, resulting in images having new sharpness values of $S_1''$, $S_2''$, and $S_3''$. The controller increases the provided voltage values until the current sharpness ratio value $S_3''/S_1''$ returns to the value $S_3/S_1$, returns to a value within a threshold of $S_3/S_1$, or returns to a value within a threshold of the calibration parameter value. Alternatively, if the optical power of adaptive lens increases, the sharpness versus voltage curve shifts to the left. Therefore the sharpness ratio decreases to less than the original value $S_3/S_1$, and the controller, at 620, instructs the VF optical element to decrease the applied voltages until the new sharpness ration returns to the original value $S_3/S_1$, returns to a value within a threshold of $S_3/S_1$, or a value within a threshold of the calibration parameter value. In embodiments, it may be required that the sharpness ratio deviate beyond a value of 1±0.05, 1±0.1, 1±0.2, 1±0.4, or 1±0.6 before any correction or tuning parameter be determined and applied to the VF optical element.

While the blocks 402-420 are described as performed by various elements in the imaging reader device, any of these steps may be performed in a controller or a processor, whether through one or more dedicated controllers or processors or one or more elements that are configured to perform other processes described herein. Additionally, the controller 214 may include one or more processors and one or more memoires.

Figure 8:
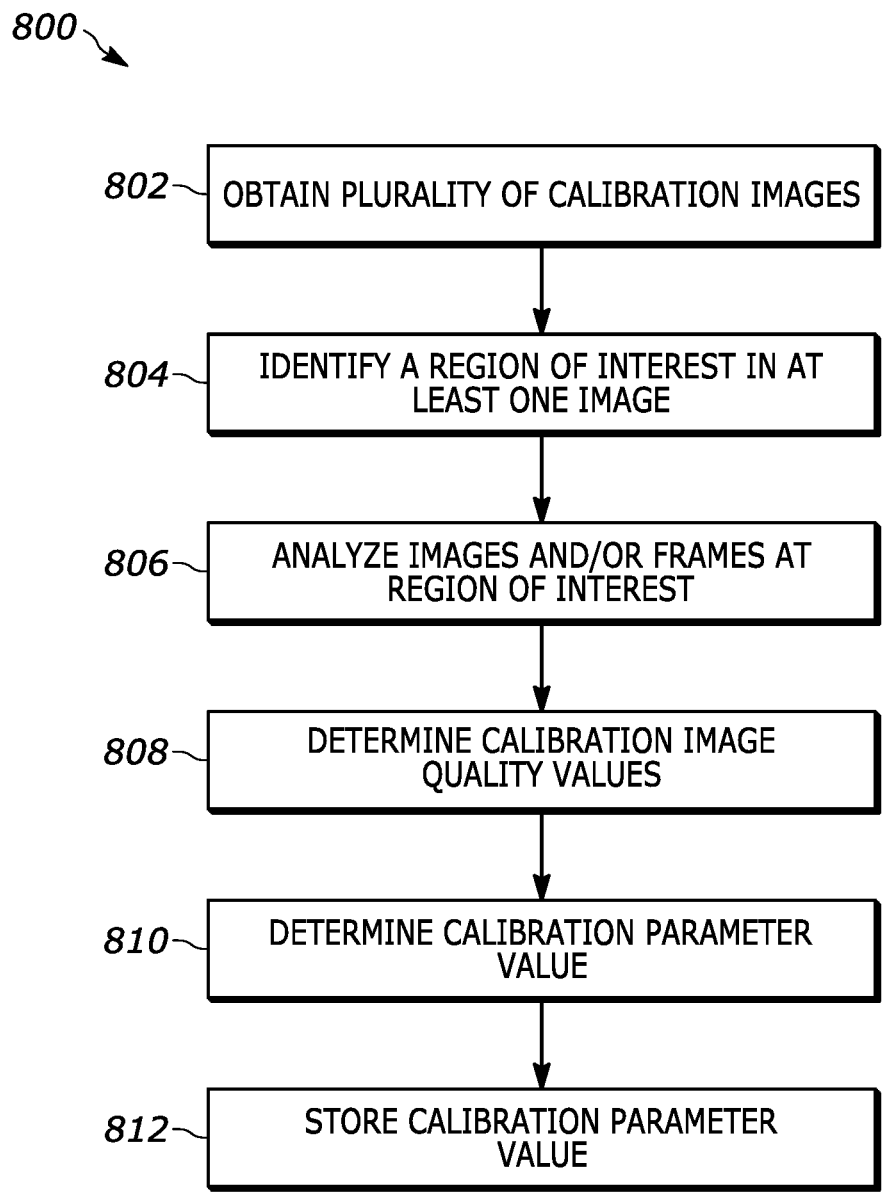
FIG. 8 illustrates a method 800 for obtaining a calibration parameter value for performing focus stabilization as described herein.

FIG. 8 illustrates a method 800 for obtaining a calibration parameter value for performing focus stabilization as described herein. The method 800 may be performed by any of the imaging readers of FIG. 1, 2 or 3, and may be performed as part of method 400 or method 600 accordingly. The imaging reader may be configured to be in a preferred state, e.g. focused to a desired focal plane, before performing the method 800 for obtaining the calibration parameter value. The method 800 includes the imaging system obtaining, at 802, a plurality of calibration images of an OOI. Each of the plurality of calibration images may be a single image obtained at a different optical focus, or each of the plurality of calibration images may include a corresponding plurality of frames, with each of the pluralities of frames obtained at a respective optical focus.

The controller or a processor, at 804, identifies a region of interest in at least one of the captured images of the plurality of calibration images. The region of interest in the at least one image may include a barcode, a serial number, alphanumeric, a graphic, or another indicia indicative of the target or OOI. The processor, at 806, analyzes each of the plurality of calibration images in the identified region of interest, and, at 808, the processor determines a set of calibration image quality values from the analyzed images. Each of the set of calibration image quality values corresponds to a respective analyzed image in the plurality of calibration images. For example, at 406, the processor may analyze each of the first plurality of images by performing image processing on each of the plurality of images. The image processing may include applying a spatial lowpass filter, spatial highpass filter, Fourier lowpass or highpass filter, performing a noise reduction, a scaling, rotation, shearing, reflection, or another image filtering or image processing technique. Additionally, analyzing each of the calibration plurality of images, and determining, at 808, the image quality values for each of the plurality of calibration images may include determining a sharpness value, a contrast value, a spatial frequency content value, a noise measurement value, a dynamic range value, a measurement of image distortion, a blur value, or another value associated with an image or image quality. The processor, at 810, may then determine the calibration parameter value from at least one of the calibration image quality values of the set of calibration image quality values. The method 800 may be perform after the imaging reader has been confirmed to be in a calibration state or focused at a calibration focus, such as at a focus producing images that result in a 100% indicia decode efficiency. Therefore, the calibration parameter value determined by the method 800, at 812, may be stored in a memory, network, or other storage medium to use at a later time or by other systems for performing focus stabilization according to the methods described herein.

While described in examples as a sharpness value, the image quality values, and calibration image quality values described herein may include one or more of a frame or image sharpness value, blur value, contrast value, spatial frequency content value, a noise value, a dynamic range value, or another value associated with image or image quality. Additionally, while described in examples herein as a sharpness ratio, the current alignment parameter value and the calibration parameter value may each independently be determine from one or more frame sharpness values, blur values, contrast values, spatial frequency content value, noise values, dynamic range values, or other value associated with image or image quality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A computer-implemented method for focus stabilization of an imaging system, the method comprising:
   obtaining, by a processor, a calibration parameter value;
   obtaining, by the imaging system, a first plurality of images of an object of interest, wherein each image of the first plurality of images is obtained by the imaging system at a different optical focus;
   identifying, by the processor, a region of interest in at least one image of the first plurality of images, wherein the region of interest contains an indicia indicative of the object of interest;
   analyzing, by the processor, each of the images of the first plurality of images at the region of interest;
   determining, by the processor, a set of image quality values from the analyzed images, wherein each of the image quality values of the set of image quality values corresponds to a respective analyzed image in the first plurality of images;
   determining, by the processor, a current alignment parameter value from at least one of the image quality values of the set of image quality values;
   determining, by the processor, a tuning parameter value by comparing the alignment parameter value with the calibration parameter value; and
   tuning, by the processor, the imaging system according to the tuning parameter.

2. The method of claim 1, wherein obtaining the calibration parameter value comprises obtaining, by the processor, the calibration parameter value from at least one of a memory, network, cloud network, wireless communication, or wired communication.

3. The method of claim 1, wherein obtaining the calibration parameter value comprises:
   obtaining, by the imaging system, a plurality of calibration images of an object of interest, wherein each image of the plurality of calibration images is obtained by the imaging system at a different optical focus;
   identifying, by the processor, a region of interest in at least one image of the plurality of calibration images, wherein the region of interest contains an indicia indicative of the object of interest;
   analyzing, by the processor, each of the images of the plurality of calibration images at the region of interest;
   determining, by the processor, a set of calibration image quality values from the analyzed images, wherein each of the calibration image quality values of the set of calibration image quality values corresponds to a respective image in the plurality of calibration images; and
   determining, by the processor, a calibration parameter value from at least one of the calibration image quality values of the set of calibration image quality values.

4. The method of claim 3, wherein obtaining the plurality of calibration images comprises obtaining a first image at a first optical focus, a second image at a second optical focus that is greater than the first optical focus, and a third image at a third optical focus that is greater than the second; and
   wherein obtaining the first plurality of images comprises obtaining a first image at a first optical focus, a second image at a second optical focus that is greater than the first optical focus, and a third image at a third optical focus that is greater than the second optical.

5. The method of claim 4, wherein the calibration parameter is determined by a ratio of the image quality values of the first image and third image of the plurality of calibration images; and
   the current alignment parameter value is determined by a ratio of the image quality values of the first image and third image of the first plurality of images.

6. The method of claim 4, wherein the calibration parameter value comprises a ratio between at least two of the image quality values of the set of calibration image quality values; and the current alignment parameter value comprises a ratio between at least two of the image quality values of the set of image quality values of the first plurality of images.

7. The method of claim 1, wherein the calibration parameter value comprises at least one of a sharpness value, a contrast value, or a spatial frequency content value.

8. The method of claim 1, wherein the current alignment parameter value at least one of an image sharpness value, a contrast value, or a spatial frequency content value.

9. The method of claim 1, wherein tuning the optical focus of the imaging system comprises tuning the focal distance of a variable focus lens by applying an operating voltage to the variable focus lens.

10. The method of claim 9, wherein the variable focus lens is one of a T-lens or a liquid lens.

11. The method of claim 1, wherein obtaining the first plurality of images comprises:

obtaining a first image by obtaining a plurality of frames at a first optical focus;

obtaining a second image by obtaining a plurality of frames at a second optical focus;

obtaining a third image by obtaining a plurality of frames at a third optical focus; and wherein identifying a region of interest in at least one image of the first plurality of images comprises identifying, by the processor, a region of interest in at least of the first image, second image, and third image of the first plurality of images.

12. The method of claim 1, further comprising:

identifying, by the processor, the indicia in the region of interest, with the indicia having a decodable payload.

13. A focus stabilization imaging system comprising:

a variable focus lens configured to receive light from an object of interest for imaging the object of interest;

a controller communicatively coupled to the variable focus lens and configured to provide a voltage to the variable focus lens;

an imaging sensor configured to receive an image of the object and to generate an electrical signal indicative of the received image;

a processor and computer-readable media storing machine readable instructions that, when executed, cause the focus stabilization imaging system to:

obtain, by the processor, a calibration parameter value;

obtain, by the imaging system, a first plurality of images of the object of interest, wherein each image of the first plurality of images is obtained by the imaging system at a different optical focus;

identify, by the processor, a region of interest in at least one image of the first plurality of images, wherein the region of interest contains an indicia indicative of the object of interest;

analyze, by the processor, each of the images of the first plurality of images at the region of interest;

determine, by the processor, a set of image quality values from the analyzed images, wherein each of the image quality values of the set of image quality values corresponds to a respective analyzed image in the first plurality of images;

determine, by the processor, a current alignment parameter value from at least one of the image quality values of the set of image quality values;

determine, by the processor, a tuning parameter value by comparing the current alignment parameter value with the calibration parameter value; and tune, by the controller, the optical focus of the imaging system according to the tuning parameter.

14. The focus stabilization imaging system of claim 13, wherein obtaining the calibration parameter value comprises obtaining, by the processor, the calibration parameter value from at least one of a memory, network, cloud network, wireless communication, or wired communication.

15. The focus stabilization imaging system of claim 13, wherein obtaining the calibration parameter value comprises:

obtaining, by the imaging system, a plurality of calibration images of an object of interest, wherein each image of the plurality of calibration images is obtained by the imaging system at a different optical focus;

identifying, by the processor, a region of interest in at least one image of the plurality of calibration images, wherein the region of interest contains an indicia indicative of the object of interest;

analyzing, by the processor, each of the images of the plurality of calibration images at the region of interest;

determining, by the processor, a set of calibration image quality values from the analyzed images, wherein each of the calibration image quality values of the set of calibration image quality values corresponds to a respective image in the plurality of calibration images; and determining, by the processor, a calibration parameter value from at least one of the calibration image quality values of the set of calibration image quality values.

16. The method of claim 15, wherein obtaining the plurality of calibration images comprises obtaining a first image at a first optical focus, a second image at a second optical focus that is greater than the first optical focus, and a third image at a third optical focus that is greater than the second; and wherein obtaining the first plurality of images comprises obtaining a first image at a first optical focus, a second image at a second optical focus that is greater than the first optical focus, and a third image at a third optical focus that is greater than the second optical.

17. The method of claim 16, wherein the calibration parameter is determined by a ratio of the image quality values of the first image and third image of the plurality of calibration images; and the current alignment parameter value is determined by a ratio of the image quality values of the first image and third image of the first plurality of images.

18. The method of claim 16, wherein the calibration parameter value comprises a ratio between at least two of the image quality values of the set of calibration image quality values; and the current alignment parameter value comprises a ratio between at least two of the image quality values of the set of image quality values of the first plurality of images.

19. The method of claim 13, wherein the calibration parameter value comprises at least one of a sharpness value, a contrast value, or a spatial frequency content value.

20. The method of claim 13, wherein the current alignment parameter value at least one of an image sharpness value, a contrast value, or a spatial frequency content value.

21. The method of claim 13, wherein tuning the optical focus of the imaging system comprises tuning the focal distance of a variable focus lens by applying an operating voltage to the variable focus lens.

22. The method of claim 21, wherein the variable focus lens is one of a T-lens or a liquid lens.

23. The method of claim 13, wherein obtaining the first plurality of images comprises:
   obtaining a first image by obtaining a plurality of frames at a first optical focus;
   obtaining a second image by obtaining a plurality of frames at a second optical focus;
   obtaining a third image by obtaining a plurality of frames at a third optical focus; and
wherein identifying a region of interest in at least one image of the first plurality of images comprises identifying, by the processor, a region of interest in at least of the first image, second image, and third image of the first plurality of images.

24. The method of claim 13, further comprising:
   identifying, by the processor, the indicia in the region of interest, with the indicia having a decodable payload.

* * * * *